(12) United States Patent
Huber et al.

(10) Patent No.: US 9,261,393 B2
(45) Date of Patent: Feb. 16, 2016

(54) CORIOLIS MASS FLOW MEASURING DEVICE

(71) Applicant: Endress + Hauser Flowtec AG, Reinach (CH)

(72) Inventors: Christof Huber, Bern (CH); Vivek Kumar, Allschwil (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 67 days.

(21) Appl. No.: 14/249,529

(22) Filed: Apr. 10, 2014

(65) Prior Publication Data

US 2015/0226590 A1 Aug. 13, 2015

(30) Foreign Application Priority Data

Feb. 12, 1944 (DE) .......................... 10 2013 101 369

(51) Int. Cl.
*G01F 1/84* (2006.01)

(52) U.S. Cl.
CPC ............ *G01F 1/8472* (2013.01); *G01F 1/8413* (2013.01); *G01F 1/8436* (2013.01); *G01F 1/8477* (2013.01)

(58) Field of Classification Search
None
See application file for complete search history.

(56) References Cited

U.S. PATENT DOCUMENTS

| | | | |
|---|---|---|---|
| 5,687,100 A | 11/1997 | Buttler et al. | |
| 7,500,404 B2 | 3/2009 | Yamane et al. | |
| 2009/0145244 A1* | 6/2009 | Rieder ................. | G01F 1/8409 73/861.355 |
| 2009/0173169 A1* | 7/2009 | Bitto ..................... | G01F 1/8418 73/861.355 |

FOREIGN PATENT DOCUMENTS

| | | |
|---|---|---|
| DE | 69703981 T2 | 5/2001 |
| DE | 102007008197 A1 | 9/2007 |

OTHER PUBLICATIONS

Aug. 30, 2013 German Search Report, German Patent Office, Munich, Germany.

* cited by examiner

*Primary Examiner* — Harshad R Patel
(74) *Attorney, Agent, or Firm* — Bacon & Thomas, PLLC (57) ABSTRACT

A Coriolis mass flow measuring device comprises a measuring device electronics as well as, connected thereto, a measuring transducer comprising at least one measuring tube, an oscillation exciter for oscillating the at least one measuring tube and, mutually spaced along the measuring tube, two oscillation sensors for generating oscillation signals representing oscillations of the measuring tube. The measuring tube is adapted to be flowed through by a medium and during that to be caused to vibrate in such a manner that the measuring tube executes wanted oscillations having a wanted frequency. The wanted oscillations are suitable to induce in the flowing medium, dependent on its mass flow rate, Coriolis forces suitable for bringing about a measurement effect of a first type, namely Coriolis oscillations of the wanted frequency superimposed on the wanted oscillations. These Coriolis oscillations are, in turn, suitable to induce in the medium centrifugal forces dependent on its mass flow rate and on its density. These centrifugal forces bring about a measurement effect of a second type, namely, superimposed on the Coriolis oscillations, centrifugal oscillations of the wanted frequency. The measuring device electronics is, among other things, adapted, based on the oscillation signals, to generate at least one mass flow, measured value, representing the mass flow rate, in such a manner that a dependence of a phase difference existing between wanted signal components of the oscillation signals is taken into consideration by the measurement effect of second type.

17 Claims, 6 Drawing Sheets

CORIOLIS MASS FLOW MEASURING DEVICE

TECHNICAL FIELD

The invention relates to a Coriolis mass flow measuring device for measuring mass flow rate of a flowing medium.

BACKGROUND DISCUSSION

Used in industrial measurements technology, especially also in connection with control and monitoring of automated manufacturing processes, for ascertaining mass flow rates of media such as liquids and/or gases flowing in a process line, for example, a pipeline, are often Coriolis mass flow measuring devices formed by means of a measuring device electronics as well as a measuring transducer of vibration type electrically connected with said measuring device electronics. Coriolis mass flow measuring devices have been known for a long time and have proven themselves in industrial use. Examples of such measuring devices are described e.g. in US-A 2007/0119264, US-A 2010/0257943, US-A 2011/0265580, U.S. Pat. No. 5,287,754, U.S. Pat. No. 5,291,792, U.S. Pat. No. 5,531,126, U.S. Pat. No. 5,602,345, U.S. Pat. No. 5,731,527, U.S. Pat. No. 5,796,010, U.S. Pat. No. 5,796,011, U.S. Pat. No. 5,945,609, U.S. Pat. No. 6,006,609, U.S. Pat. No. 6,092,429, U.S. Pat. No. 6,223,605, U.S. Pat. No. 6,311,136, U.S. Pat. No. 6,513,393, U.S. Pat. No. 6,840,109, U.S. Pat. No. 6,920,798, U.S. Pat. No. 7,017,424, U.S. Pat. No. 7,077,014, U.S. Pat. No. 7,325,462, WO A 01/02 816, and WO A 99/40 394.

Each of the therein disclosed measuring transducers comprises at least one, essentially straight or at least sectionally curved, measuring tube for conveying the medium. The measuring tube is additionally especially adapted to be flowed through by the medium and during that to be caused to vibrate in such a manner that it executes about an imaginary oscillation axis, most often an axis parallel to an imaginary longitudinal axis of the measuring transducer, bending oscillations—herein referred to as wanted oscillations or also wanted mode—having a wanted frequency corresponding to a resonant frequency of the measuring transducer. The wanted oscillations of the measuring tube serve in the case of Coriolis mass flow measuring devices, among other things, for inducing in the flowing medium Coriolis forces dependent on the instantaneous mass flow rate. These Coriolis forces, in turn, bring about a measurement effect dependent on the mass flow rate, namely Coriolis oscillations with the wanted frequency superimposed on the wanted oscillations. In the case of measuring transducers with curved measuring tubes, e.g. formed U-, V- or -like, selected for the wanted oscillations is usually a fundamental mode of a bending oscillation or an oscillation form corresponding to a next higher ordered, symmetric, bending oscillation mode, in the case of which oscillation form the at least one measuring tube moves about the imaginary oscillation axis in a pendulum like manner like the oscillations of a cantilever clamped at one end. The Coriolis oscillations resulting therefrom correspond to that eigenoscillation form—at times, also referenced as twist mode—, in the case of which the measuring tube executes rotary oscillations about an imaginary rotation axis directed perpendicularly to the imaginary oscillation axis, most often also parallel to an imaginary vertical axis of the measuring transducer. In the case of measuring transducers with straight measuring tubes, in contrast, selected for the purpose of producing Coriolis forces is often such a wanted mode, in the case of which the measuring tube executes, at least partially, bending oscillations essentially in a single imaginary plane of oscillation, so that the Coriolis oscillations are embodied accordingly as bending oscillations, which are coplanar with the wanted oscillations. Due to the Coriolis oscillations, there exists between inlet-side and outlet-side, oscillatory movements of the vibrating measuring tube a travel time, respectively phase difference, dependent on the mass flow rate, and, consequently, usable as measurement effect for the mass flow measurement. Since the wanted frequency is, especially, also dependent on the instantaneous density of the medium, besides the mass flow rate, supplementally also the density of flowing media can be measured by means of market-usual Coriolis mass flow measuring devices. Furthermore, it is also possible, such as disclosed, among other things, in the initially mentioned US-A 2011/0265580, by means of such measuring transducer of vibration type, consequently therewith formed Coriolis mass flow measuring devices, directly to measure viscosity of the flowing medium, for example, based on an excitation power required for exciting, respectively maintaining, the wanted oscillations.

In the case of measuring transducers with two measuring tubes, these are most often connected into the process line via a distributor piece extending on the inlet-side between the measuring tubes and an inlet-side, connecting flange as well as via a distributor piece extending on the outlet-side between the measuring tubes and an outlet-side, connecting flange. In the case of measuring transducers with a single measuring tube, the latter communicates most often with the process line via a connecting tube on the inlet-side as well as via a connecting tube on the outlet-side. Furthermore, measuring transducers with a single measuring tube include at least one counteroscillator of one piece or a plurality of parts, for example, a tube-, box- or plate-shaped, counteroscillator, which is coupled with the measuring tube on the inlet-side to form a first coupling zone and with the measuring tube on the outlet-side to form a second coupling zone. During operation, the counteroscillator essentially rests or oscillates opposite equally relative to the measuring tube thus with equal frequency and opposite phase. The inner part of the measuring transducer formed by means of measuring tube and counteroscillator is most often held in a protective measuring transducer housing alone by means of the two connecting tubes, via which the measuring tube communicates during operation with the process line. Especially, this assembly is accomplished in a manner enabling oscillations of the inner part relative to measuring transducer housing. In the case of the measuring transducers disclosed, for example, in U.S. Pat. No. 5,291,792, U.S. Pat. No. 5,796,010, U.S. Pat. No. 5,945,609, U.S. Pat. No. 7,077,014, US-A 2007/0119264, WO A 01/02 816 or and WO A 99/40 394 having a single, essentially straight, measuring tube, the latter and the counteroscillator are, such as quite usual in the case of conventional measuring transducers, oriented essentially coaxially with one another, in that the counteroscillator is embodied as an essentially straight, hollow cylinder and is so arranged in the measuring transducer that the measuring tube is at least partially jacketed by the counteroscillator. Used as materials for such counteroscillators, especially also in the case of application of titanium, tantalum or zirconium for the measuring tube, are, most often, comparatively cost effective steel types, such as, for instance, structural steel or free machining steel.

For active exciting, respectively maintaining, of the wanted oscillations, measuring transducers of vibration type have, additionally, an exciter mechanism formed by means of at least one electromechanical oscillation exciter acting during operation differentially on the at least one measuring tube and the, in given cases, present counteroscillator, respectively the, in given cases, present, other measuring tube. The oscillation exciter, most often an electrodynamic oscillation exciter, serves, driven by an electrical exciter signal, for example, having a controlled electrical current, generated by the mentioned measuring device electronics and correspondingly conditioned, especially to convert an electrical excitation power fed therewith into a corresponding drive force effecting the wanted oscillations, for example, also in such a manner that the wanted oscillations have a constant oscillation amplitude. Oscillation exciters of usually marketed measuring transducers of vibration type are typically constructed as a kind of oscillatory coil, namely, in the case of measuring transducers with a measuring tube and a thereto coupled counteroscillator, formed of a magnet coil most often affixed to the latter as well as a permanent magnet serving as magnet armature correspondingly affixed to the measuring tube to be moved and interacting with the at least one magnet coil. The permanent magnet and the magnet coil are, in such case, usually so oriented, that they extend essentially coaxially with respect to one another. Additionally in the case of conventional measuring transducers, the oscillation exciter is most often so embodied and placed that it acts essentially centrally on the at least one measuring tube. Alternatively to an exciter mechanism formed by means of oscillation exciters acting centrally and directly on the measuring tube, it is also an option, such as set forth, among other things, in the initially mentioned U.S. Pat. No. 6,092,429, for example, also to use exciter mechanisms formed by means of two oscillation exciters affixed not in the center of the measuring tube, but, instead, rather on the inlet, respectively outlet, sides thereof, or, such as provided, among other things, in U.S. Pat. No. 6,223,605 or U.S. Pat. No. 5,531,126, for example, also exciter mechanisms formed by means of an oscillation exciter acting between the, in given cases, present counteroscillator and the measuring transducer housing.

For registering inlet-side, respectively outlet-side, oscillations of the at least one measuring tube, not least of all of its oscillations with the wanted frequency, and for producing the electrical oscillation signals influenced for measuring mass flow rate, measuring transducers of the type being discussed have, furthermore, two or more oscillation sensors spaced from one another along the measuring tube. Such oscillation sensors are so adapted that therewith generated oscillation signals led to the measuring device electronics have a wanted signal component with a signal frequency corresponding to the wanted frequency and that the aforementioned travel time, respectively phase difference, is measurable between a wanted signal component of an oscillatory signal representing inlet-side oscillations and a wanted signal component of an oscillatory signal representing outlet-side oscillations. In the case of measuring transducers of usually marketed Coriolis mass flow measuring devices, the oscillation sensors are essentially embodied of equal construction as that of the at least one oscillation exciter, at least, insofar as they work according to the same principle of action, for example, being again of electrodynamic type. Accordingly, the oscillation sensors of such a sensor arrangement are also most often likewise, in each case, formed by means of a permanent magnet affixed to the measuring tube and at least one coil (for example, a coil affixed on the, in given cases, present, other measuring tube or on the, in given cases, present counteroscillator) permeated by a magnetic field of the permanent magnet. As a result of the oscillatory movements of the at least one measuring tube, the coil then experiences, at least at times, an induced measurement voltage.

Both the coil of the at least one oscillation exciter as well as also the coils of the oscillation sensors are additionally electrically connected, in each case by means of a pair of electrical connecting lines, with the measuring device electronics.

In the case of conventional Coriolis mass flow measuring devices, the ascertaining of the mass flow, measured values representing the mass flow rate occurs fundamentally based on a ratio of the phase difference to the wanted frequency multiplied by an earlier calibrated, measuring device specific, calibration factor, plus or minus a zero point of the measuring device corresponding to a measurable phase difference when there is no flow in the measuring tube. Thus, the calculation is based on a linear function of said ratio. At times calibration factor affecting dependencies on density and/or viscosity of the momentary medium or also such dependencies on the momentary pressures reigning in the medium are compensated in such case in measuring operation by means of special measuring and calculating algorithms correspondingly implemented in the measuring device electronics. Experimental investigations on conventional Coriolis mass flow measuring devices have now shown that the aforementioned mathematical approach usually selected for calculating the mass flow, measured values can lead, at times, to increased measurement errors. This is the case surprisingly especially also for measuring transducers having a nominal diameter of less than 50 mm corresponding to the caliber of the connected process line, respectively corresponding to a nominal cross section of less than 2000 mm$^2$ or for measuring transducers with measuring tubes, whose caliber is less than 20 mm, consequently especially in the case of measuring transducers, which usually have a rather high area-normalized sensitivity, defined as the ratio of the phase difference to an area-normalized mass flow rate, especially a mass flow rate referenced to the nominal cross section of the measuring transducer, of greater than 10 rad kg$^{-1}$·s·mm$^2$. Moreover, it could be detected that increased measuring errors can also happen increasingly in the case of fluid dynamically rather stable mass flow rates, consequently actually uncritical mass flow rates, in the order of magnitude of 50% of the respective measurement range end value. In other words, an undesired dependence of the accuracy of measurement, with which the mass flow rate is ascertained, on the actual mass flow rate of the medium could be detected. Moreover, it could be detected that said measuring error additionally also has a certain dependence on the instantaneous density of the medium.

SUMMARY OF THE INVENTION

An object of the invention is, consequently, to provide a Coriolis mass flow measuring device, which has no, or at least a lessened, dependence of the accuracy of measurement, with which the mass flow rate is ascertained, on the actual mass flow rate of the medium.

For achieving the object, the invention resides in a Coriolis mass flow measuring device comprising a measuring device electronics as well as a measuring transducer electrically connected with said measuring device electronics, wherein the measuring transducer comprises at least one measuring tube, for example, an at least sectionally curved measuring tube, for conveying a flowable medium, an oscillation exciter for exciting and maintaining oscillations of the at least one measuring tube, a first oscillation sensor for registering oscillations, for example, inlet-side oscillations, of the at least one measuring tube, and a second oscillation sensor spaced along the measuring tube from the first oscillation sensor for registering oscillations, for example, outlet-side oscillations, of the at least one measuring tube. The measuring tube of the Coriolis mass flow measuring device of the invention is adapted to be flowed through by a medium having a density and a mass flow rate and during that to be caused to vibrate in such a manner that it executes wanted oscillations, namely bending oscillations having a wanted frequency corresponding to a resonant frequency of the measuring transducer, which wanted oscillations are suitable to induce in the flowing medium, dependent on its mass flow rate, Coriolis forces suitable to bring about a measurement effect of first type, namely Coriolis oscillations of the wanted frequency superimposed on the wanted oscillations, wherein said Coriolis oscillations are suitable to induce in the medium, dependent on its mass flow rate and on its density, centrifugal forces, and that said centrifugal forces are suitable to bring about a measurement effect of second type, namely centrifugal oscillations of the wanted frequency superimposed on the Coriolis oscillations. The measuring device electronics of the Coriolis mass flow measuring device of the invention is additionally adapted for exciting the wanted oscillations of the measuring tube to generate, for driving the oscillation exciter, an exciter signal, which has an excitation frequency, namely a signal frequency corresponding to the wanted frequency, and the oscillation exciter is adapted to excite by means of the exciter signal the wanted oscillations of the at least one measuring tube. The first oscillation sensor is additionally adapted to deliver a first oscillatory signal representing oscillations of the at least one measuring tube, in such a manner that said oscillatory signal has a wanted signal component with a signal frequency corresponding to the wanted frequency, and the second oscillation sensor is adapted to deliver a second oscillatory signal representing oscillations of the at least one measuring tube in such a manner that said oscillatory signal has a wanted signal component with a signal frequency corresponding to the wanted frequency and that between the wanted signal component of the first oscillation signal and the wanted signal component of the second oscillation signal a phase difference exists dependent both on the measurement effect of first type as well as also on the measurement effect of second type, namely a phase difference having both a Coriolis fraction representing the measurement effect of first type as well as also a centrifugal fraction representing the measurement effect of second type. Furthermore, the measuring device electronics of the Coriolis mass flow measuring device of the invention is also adapted to receive the first and second oscillatory signals and based on the first and second oscillatory signals to generate at least one mass flow, measured value representing the mass flow rate, in such a manner that a dependence of the phase difference existing between the wanted signal component of the first oscillation signal and the wanted signal component of the second oscillation signal is taken into consideration, respectively compensated, by the measurement effect of second type.

According to a first embodiment of the invention, the measuring device electronics is adapted to ascertain the phase difference for generating the mass flow, measured value.

According to a second embodiment of the invention, the measuring device electronics is adapted to ascertain the centrifugal fraction of the phase difference for generating the mass flow, measured value.

According to a third embodiment of the invention, the measuring device electronics is adapted to ascertain the Coriolis fraction of the phase difference for generating the mass flow, measured value.

According to a fourth embodiment of the invention, the measuring device electronics is adapted by application of the first and second oscillation signals to ascertain a total phase measured value, which represents a phase difference reduced by a scale zero point, namely a phase difference existing between the wanted signal components of the sensor signals for a measuring tube vibrating with the wanted frequency but not flowed through by medium, and the measuring device electronics is adapted to generate the mass flow, measured value by means of the total phase measured value.

According to a fifth embodiment of the invention, the measuring device electronics is adapted to generate by application of the first and second oscillation signals a centrifugal phase measured value representing the centrifugal fraction of the phase difference and the measuring device electronics is, furthermore, adapted to generate the mass flow, measured value by means of the centrifugal phase measured value.

According to a sixth embodiment of the invention, the measuring device electronics is adapted to generate by application of the first and second oscillation signals a Coriolis phase measured value representing the Coriolis fraction of the phase difference and the measuring device electronics is, furthermore, adapted to generate the mass flow, measured value by means of the Coriolis phase measured value.

According to a seventh embodiment of the invention, the measuring device electronics is adapted to ascertain based on the excitation frequency of the exciter signal and/or the signal frequency of at least one of the wanted signal components a frequency measured value representing the wanted frequency and the measuring device electronics is, furthermore, adapted to generate the mass flow, measured value by means of the frequency measured value.

According to an eighth embodiment of the invention, the measuring device electronics is adapted to ascertain based on the excitation frequency of the exciter signal and/or the signal frequency of at least one of the wanted signal components a density measured value representing the density of the medium and the measuring device electronics is, furthermore, adapted to generate the mass flow, measured value by means of the density measured value.

According to a ninth embodiment of the invention, it is, furthermore, provided that the at least one measuring tube has a caliber, which is less than 50 mm, for example, also less than 20 mm.

According to a tenth embodiment of the invention, it is, furthermore, provided that the measuring transducer has a nominal cross section of less than 2000 mm$^2$ as well as an area-normalized sensitivity E' of greater than 10 rad kg$^{-1}$·s·mm$^2$, defined as a ratio of the Coriolis fraction of the phase difference to an area-normalized mass flow rate, namely one normalized with reference to the nominal cross section of the measuring transducer.

A basic idea of the invention is, in the ascertaining of the mass flow, measured values, to process the measured phase difference no longer only as a measured variable dependent on Coriolis forces, consequently attributed alone to the Coriolis oscillations, but, instead, additionally also to take into consideration centrifugal oscillations as another cause for the measured phase difference. These centrifugal oscillations originate from the Coriolis oscillations, are superimposed on the Coriolis oscillations, and likewise have the same wanted frequency. The influence on the phase difference of the centrifugal forces inducing the centrifugal oscillations is correspondingly compensated in the present invention.

BRIEF DESCRIPTION OF THE DRAWINGS

The invention as well as other advantageous embodiments thereof will now be explained in greater detail based on examples of embodiments, which are presented in the figures of the drawing. Equal parts are provided in all figures with equal reference characters; when perspicuity requires or it otherwise appears sensible, already mentioned reference characters are omitted in subsequent figures. Other advantageous embodiments or further developments, especially also combinations, of first only individually explained aspects of the invention will become evident, furthermore, from the figures of the drawing, as well as also from the dependent claims per se. The figures of the drawing show as follows:

DETAILED DISCUSSION IN CONJUNCTION WITH THE DRAWINGS

Figure 8:
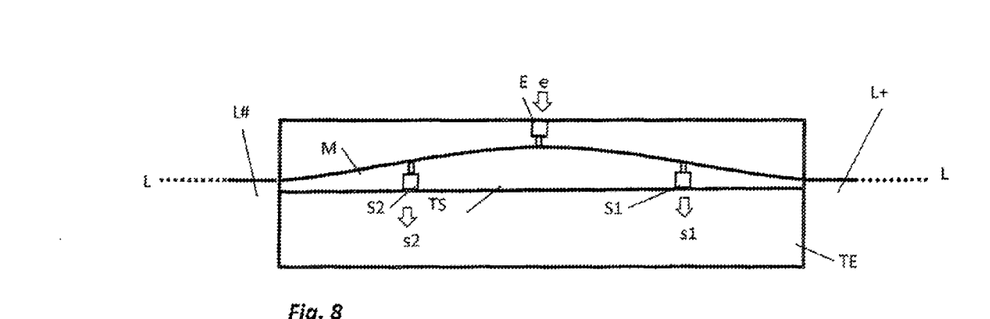
FIG. 8 shows schematically, an oscillation form of a measuring transducer according to FIG. 2, respectively FIG. 3.
Figure 9:
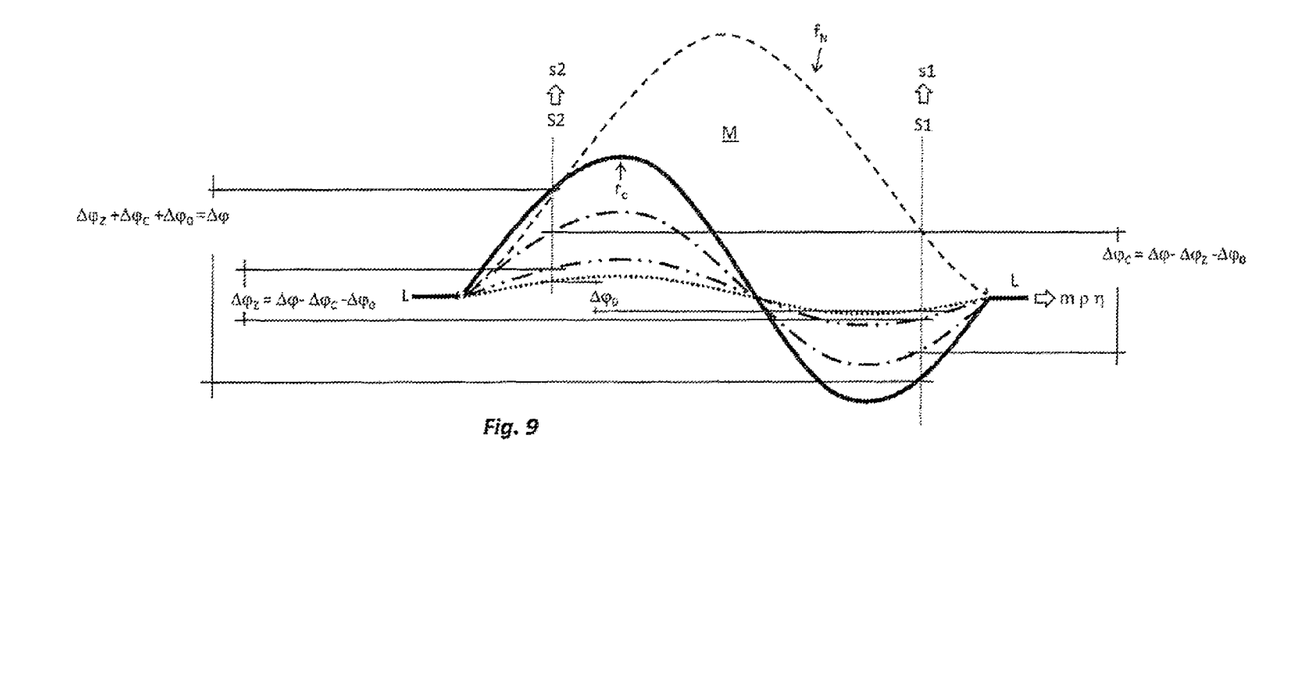
FIG. 9 shows schematically, an oscillation fraction of oscillations of the measuring tube of the measuring transducer according to FIG. 2, respectively FIG. 3.

FIGS. 1-6 show, in different views, a Coriolis mass flow measuring device for ascertaining mass flow, namely a total mass flowed during a predeterminable or earlier determined measurement interval, and/or a mass flow rate of a medium, especially a liquid or a gas, flowing in a pipeline L only schematically illustrated in FIG. 8, respectively FIG. 9. The Coriolis mass flow measuring device comprises a measuring transducer MT of vibration type flowed through during operation by medium, as well as a measuring device electronics ME, shown only in FIG. 1, for producing the measured values representing mass flow rate, respectively mass flow, respectively for outputting such a measured value as a currently valid, measured value of the Coriolis mass flow measuring device to a corresponding measurement output of the measuring device electronics ME. According to an embodiment of the invention, the measuring device electronics, consequently the therewith formed Coriolis mass flow measuring device, is furthermore, provided, supplementally, to output also a density of the medium to be measured, respectively measured values representing such, to the measurement output.

Figure 1:
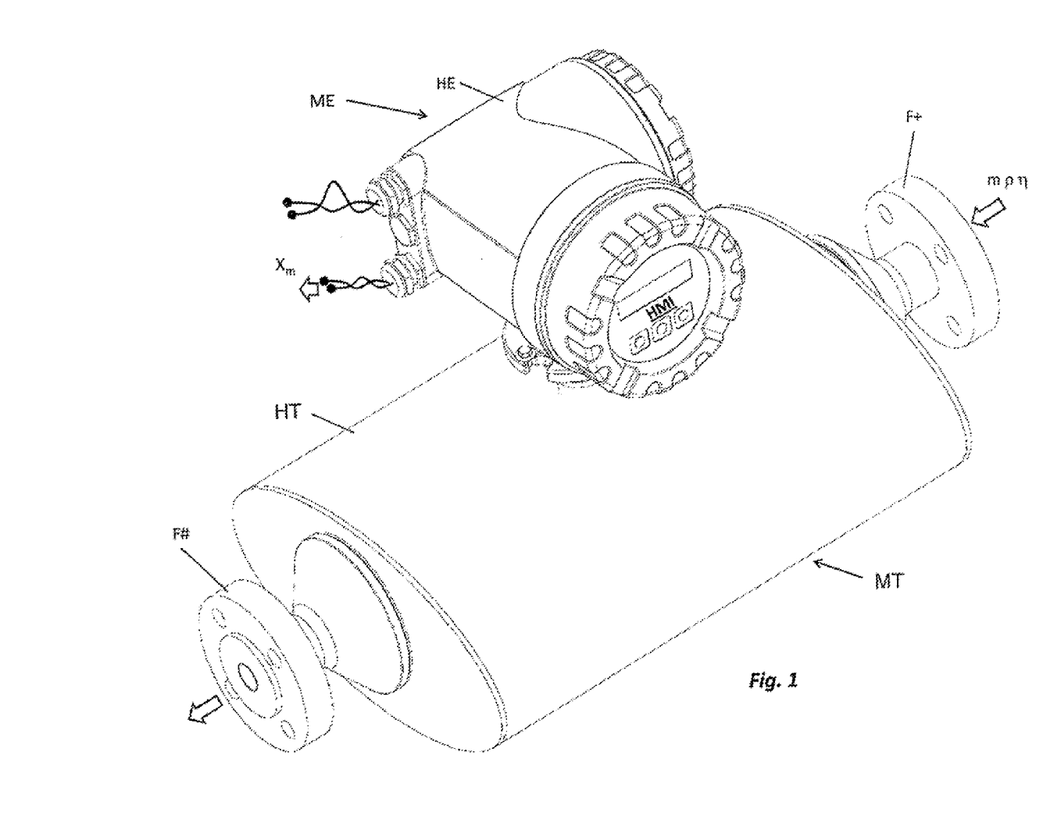
FIG. 1 is a perspective, side view, especially suitable for application in industrial measuring and automation technology, a measuring system including a measuring transducer of vibration type in a measuring transducer housing and a measuring and operating electronics accommodated in an electronics housing secured on the measuring transducer housing.

The measuring device electronics ME, formed e.g. by means of at least one microprocessor and/or by means of a digital signal processor (DSP), can, such as indicated in FIG. 1, be accommodated in a single electronics housing HE of the Coriolis mass flow measuring device.

The measured values generated by means of the measuring device electronics ME can be displayed, for example, on site, namely directly at the measuring point formed by means of the Coriolis mass flow measuring device. For visualizing measured values produced internally by the measuring device and/or, in given cases, system status reports generated internally by the measuring device, such as, for instance, an error report or an alarm, on site, the Coriolis mass flow measuring device can, as well as also indicated in FIG. 1, have, for example, a display and servicing element HMI, in given cases, a portable, display and servicing element HMI, communicating with the measuring device electronics, such as, for instance, an LCD, OLED or TFT display placed in the electronics housing HE behind a window correspondingly provided therein, as well as a corresponding input keypad and/or a touch screen. In advantageous manner, the measuring device electronics, for example, also a (re)programmable, respectively remotely parameterable measuring device electronics, can, additionally be so designed that it can, during operation of the Coriolis mass flow measuring device, via a data transmission system, for example, a fieldbus system and/or wirelessly per radio, exchange measuring and/or other operating data (such as, for instance, current measured values, system diagnosis values or, however, also setting values serving for control of the Coriolis mass flow measuring device) with an electronic data processing system superordinated to such, for example, a superordinated system in the form of a programmable logic controller (PLC), a personal computer and/or a work station. Furthermore, the measuring device electronics ME can be so designed that it can be fed by an external energy supply, for example, also via the aforementioned fieldbus system. For the case, in which the Coriolis mass flow measuring device is provided for coupling to a fieldbus or other communication system, the measuring device electronics ME, for example, also an on site and/or via communication system (re)programmable, measuring device electronics ME, can additionally have a corresponding communication interface, especially one conforming to relevant industry standards, for data communication, e.g. for sending measuring and/or operating data, consequently measured values representing mass flow, respectively mass flow rate, to the already mentioned programmable logic controller (PLC) or to a superordinated process control system and/or for receiving settings data for the Coriolis mass flow measuring device. Moreover, the measuring device electronics ME can have, for example, an internal energy supply circuit, which is fed via the aforementioned fieldbus system, during operation, by an external energy supply provided in the aforementioned data processing system. In such case, the Coriolis mass flow measuring device can, for example, be embodied as a so called four conductor device, in the case of which the internal energy supply circuit of the measuring device electronics ME can be connected by means of a first pair of lines with an external energy supply and the internal communication circuit of the measuring device electronics ME by means of a second pair of lines with an external data processing circuit or an external data transmission system.

The measuring transducer is formed by means of a measuring tube M having an inlet-side, first tube end M+ and an outlet-side, second tube end M#. Measuring tube M furthermore has a tube wall of predetermined wall thickness and a lumen extending between its first and second tube ends and surrounded by said tube wall. The measuring tube M is, especially, adapted in operation of the Coriolis mass flow measuring device to convey medium flowing in its lumen forming a traversing flow path communicating with a lumen of the connected pipeline and during such time to be caused to oscillate about a static resting position of the measuring tube for producing the mass flow rate dependent, Coriolis forces.

Especially, the measuring tube M is—such as usual in the case of Coriolis mass flow measuring devices—additionally, furthermore, designed to be directly inserted into the course of the mentioned pipeline L and so to be connected thereto, namely to an inlet-side, first line segment L+ of the pipeline L and to an outlet-side, second line segment L# of the pipeline such that the lumen of the measuring tube communicates with a respective lumen of each of the two line segments L+, L# and a flow path is formed enabling flow from the first line segment L+, through the measuring tube M and into the second line segment L#. The measuring tube M can—such as usual in the case of such measuring transducers—be made, for example, of a stainless steel or also a titanium, a tantalum and/or a zirconium alloy and can, for example, also be a one piece metal tube, and have, for example, a caliber greater than 0.5 mm.

In the example of an embodiment shown here, the measuring transducer has, except for the—here single—measuring tube M, no (further) tube adapted to convey a medium flowing in a lumen and during that caused to oscillate about its static resting position. However, the measuring transducer comprises in the example of an embodiment shown here, supplementally to the measuring tube M, a first support element TE, which is mechanically connected with a first support end TE+ with the tube end M+ of the measuring tube M and with a second support end TE# with the tube end M# of the measuring tube M, as well as a second support element TS laterally spaced from the measuring tube and formed, for example, by means of a blind tube constructed otherwise equally to the measuring tube M and/or extending at least sectionally parallel to the measuring tube M. The second support element TS is mechanically coupled with the support element TE both via a first support end TS+ as well as also via a second support end TS#. The support element TE is, among other things, also designed to be applied into the course of the mentioned pipeline L in such a manner that the lumen of the measuring tube communicates with a lumen of said pipeline, in order to form the mentioned flow path, as well as to be so connected mechanically with said pipeline such that, as a result, the entire measuring transducer MT is held in the pipeline. This is accomplished, especially, also in such a manner that mechanical loadings carried in the pipeline, especially clamping forces, respectively torques, are predominantly absorbed by the support element TE and consequently kept largely away from the other components of the measuring transducer MT. For connecting support element TE together with the measuring tube M to the pipeline, each of the support ends TE+, TE# of the support element TE can have—such as quite usual in the case of such measuring transducers—, in each case, a corresponding connecting flange F+, respectively F#, into which opens, in each case, a corresponding tube end M+, respectively M#, of the measuring tube M.

It should at this point be expressly noted that—although the measuring transducer in the example of an embodiment shown here has only a single curved measuring tube—for implementing the invention, of course, also measuring transducers with straight and/or more than one measuring tube can serve; compare, for instance, the measuring transducers disclosed in the initially mentioned U.S. Pat. No. 6,006,609, U.S. Pat. No. 6,513,393, U.S. Pat. No. 7,017,424, U.S. Pat. No. 6,840,109, U.S. Pat. No. 6,920,798, U.S. Pat. No. 5,796, 011, U.S. Pat. No. 5,731,527 and U.S. Pat. No. 5,602,345, or, for example, also those products of the assignee sold under the marks "PROMASS I", "PROMASS M", respectively "PROMASS E", "PROMASS F" and "PROMASS X". In accordance therewith, the measuring transducer can also have for conveying medium to be measured a single straight measuring tube or at least two measuring tubes, for example, mechanically coupled with one another by means of an inlet-side, flow divider and an outlet-side, flow divider and, in given cases, supplementally also by means of at least one inlet-side coupling element and at least one outlet-side coupling element, and/or constructed equally to one another and/or curved and/or parallel to one another. During operation, in each case, the measuring tubes are caused to vibrate with the—then shared—wanted frequency, however, with opposite phase relative to one another.

As evident from FIGS. 2-5, respectively 8 or 9, the measuring transducer comprises, furthermore, at least one oscillation exciter E—for example, also a single oscillation exciter E—electrically connected to the measuring device electronics ME by means of a pair of connection wires—not shown here for reasons of perspicuity—, and correspondingly operable thereby, for exciting, respectively maintaining, mechanical oscillations of the measuring tube M about its static resting position, and, indeed, in such a manner that the measuring tube M executes, at least partially, wanted oscillations, namely bending oscillations about its static resting position with a wanted frequency $f_N$ suitable for producing Coriolis forces, wherein typically selected as wanted frequency $f_N$ is a resonant frequency of a natural oscillatory mode inherent to the measuring transducer—referenced in the following also as drive, or also as wanted, mode.

Figure 7:
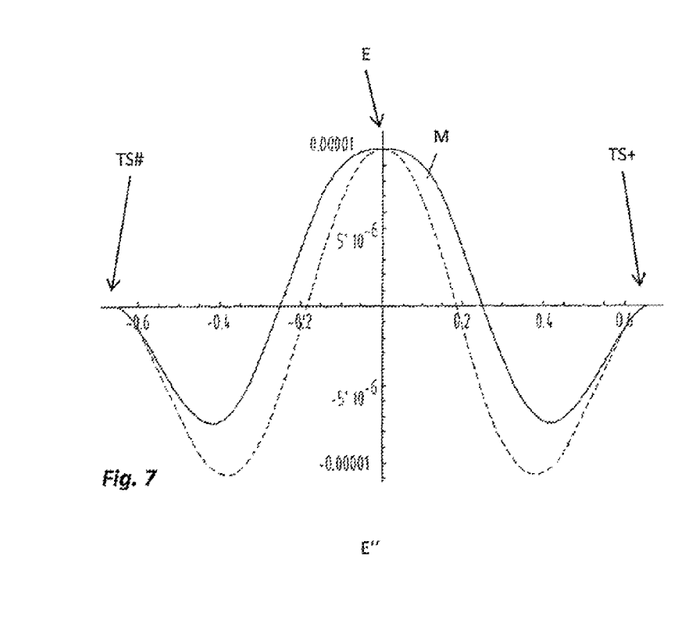
FIG. 7 shows schematically, oscillation forms of a measuring tube of a measuring transducer according to FIG. 2, respectively FIG. 3.

In the example of an embodiment shown in FIGS. 1-6, an oscillatory length of the measuring tube, namely a length thereof actually executing wanted oscillations, extends from the support end TS+ to the support end TS# of the support element TS. Especially selected as wanted mode, in such case, is such a natural oscillatory mode of the measuring transducer MT. Consequently, excited as wanted oscillations during operation are such resonant oscillations of the measuring transducer MT, which, on the one hand, have an as high as possible sensitivity to the mass flow rate of the medium flowing and whose resonant frequency is, on the other hand, also dependent in high measure also on density ρ (which is, typically, also variable in time) of the medium conveyed in the measuring tube, consequently enabling a high resolution both for slight fluctuations of the mass flow rate as well as also slight fluctuations of the density of the medium. In the case of the measuring transducer shown here, for example, bending oscillations of the measuring tube M about an imaginary oscillation axis imaginarily connecting its two tube ends M+, M# have proved themselves as especially suitable for application as wanted oscillations, which—such as schematically shown in FIG. 7—have over the entire oscillatory length of the measuring tube exactly four oscillation nodes, consequently exactly three oscillation antinodes. In an additional embodiment of the invention, the oscillation exciter E is, consequently, adapted to excite such oscillations of the measuring tube M as wanted oscillations, which, such as schematically shown in FIG. 7, have three oscillation antinodes, consequently four oscillation nodes. The latter lie in at least one imaginary projection plane of the measuring transducer on the mentioned imaginary, oscillation axis imaginarily connecting the two tube end M+, M# with one another.

The oscillation exciter E can, such as evident from FIGS. 2-5, be formed, for example, by means of a first exciter component E' affixed externally on the measuring tube M, for example, even connected by material bonding with its tube wall, as well as by means of a second exciter component E" mounted on the support element TE—here namely placed on an inner side of the support element TE facing the measuring tube, whereby, for example, the efficiency, with which the wanted oscillations are excitable, can be improved in that, as well as also schematically shown in FIG. 8, practically no mentionable excitation power is converted by means of the so formed oscillation exciter into oscillations of the support element TS unusable for measuring the mass flow rate. For the mentioned case, in which the oscillation exciter E is an electrodynamic oscillation exciter, the exciter component E' can be formed, for example, by means of a permanent magnet and the exciter component E" by means of a cylindrical coil complementary to the permanent magnet—. According to an additional embodiment of the invention, it is, in such case, furthermore provided that the measuring transducer—such as also evident from a combination of FIGS. 2-5, has, except for the oscillation exciter E, no oscillation exciter having an exciter component mounted on the support element TE, respectively on the support element TS.

The Coriolis forces induced by means of the wanted oscillations in the flowing medium are dependent, especially, on the mass flow rate of the medium flowing in the measuring tube. As a result of the Coriolis forces produced by means of the wanted oscillations in the flowing medium, the measuring tube executes, supplementally to said wanted oscillations, also Coriolis oscillations, namely oscillations about its static resting position induced by Coriolis forces and having a frequency corresponding to the wanted frequency. The Coriolis oscillations correspond typically to a natural oscillatory mode having a resonant frequency equally inherent to the measuring transducer, but deviating from the resonant frequency of the wanted mode. In this natural oscillatory mode, the measuring tube can execute, respectively executes, oscillations—for example, bending oscillations about the mentioned oscillation axis—with, in each case, one oscillatory antinode and one oscillation node more, or, however, also—for instance, for the aforementioned case, in which the wanted oscillations have four oscillation nodes and three oscillation antinodes—with, in each case, one oscillatory antinode and one oscillation node less than in the case of the wanted oscillations.

Figure 2:
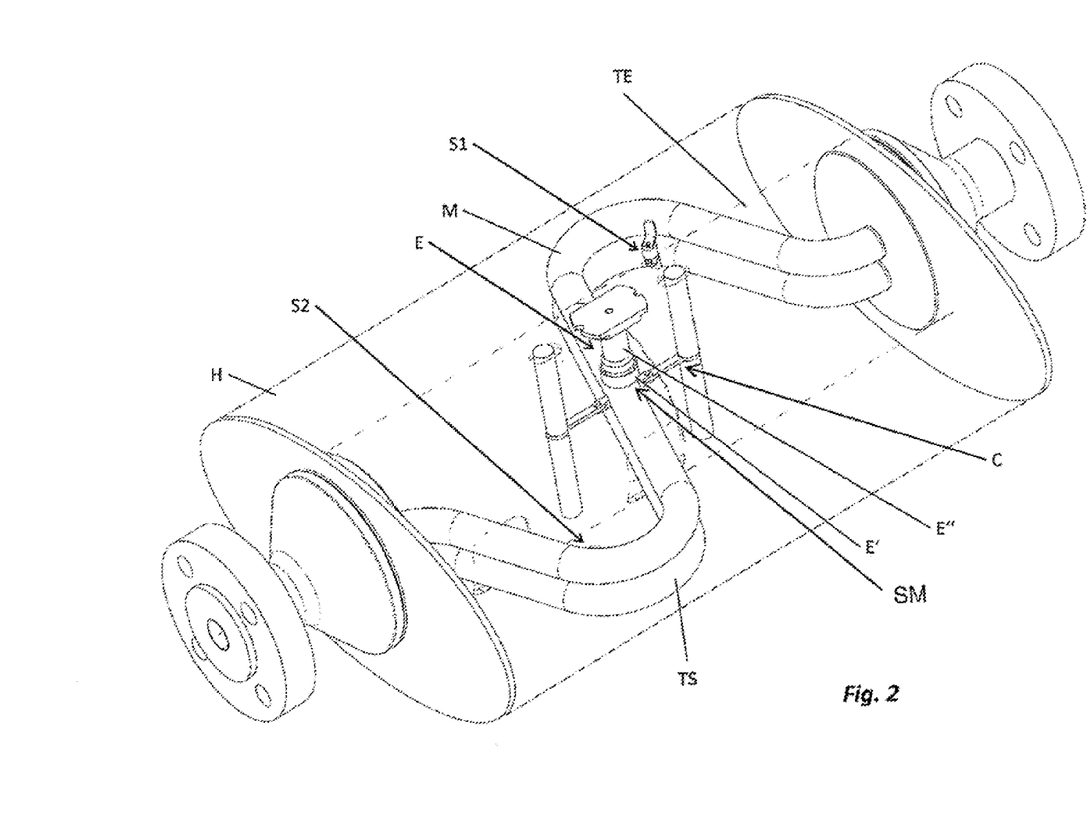
FIGS. 2, 3 is a in different perspective, side views, an example of an embodiment of a measuring transducer of vibration type suitable for a measuring system according to FIG. 1 and including a measuring tube.
Figure 3:
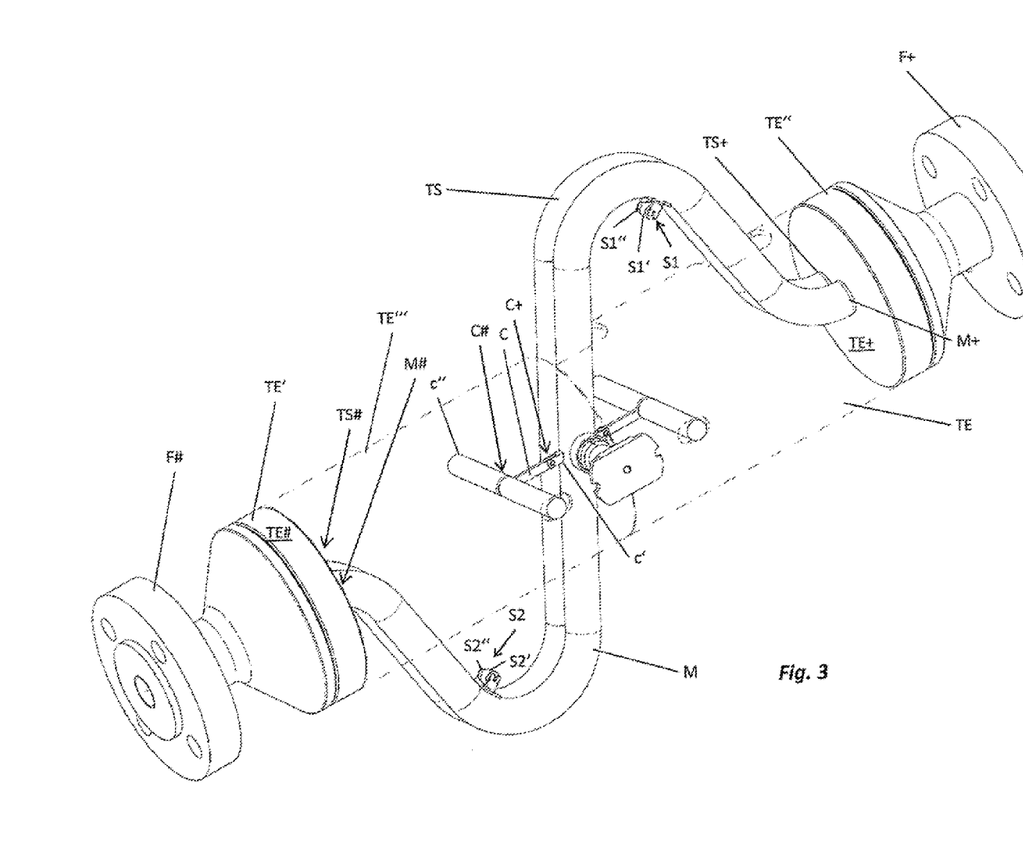
Figure 4:
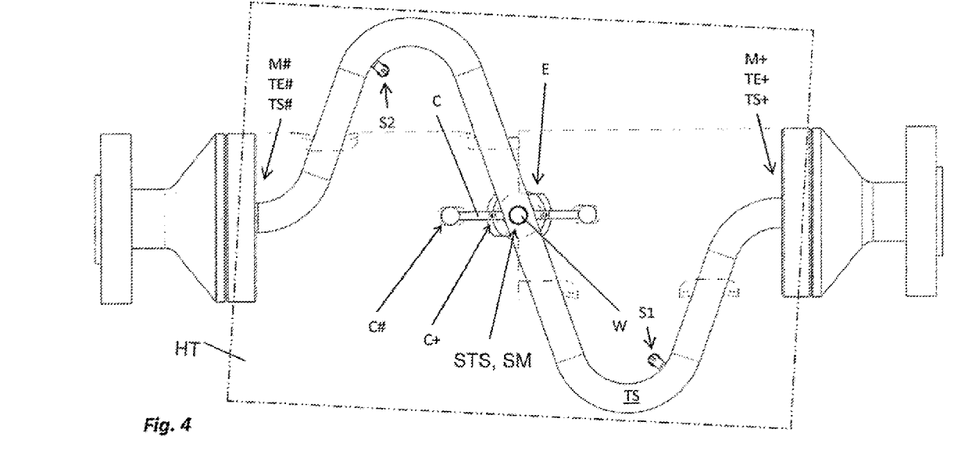
FIGS. 4, 5 and 6 are different side views, a measuring transducer according to FIG. 2, respectively FIG. 3.
Figure 5:
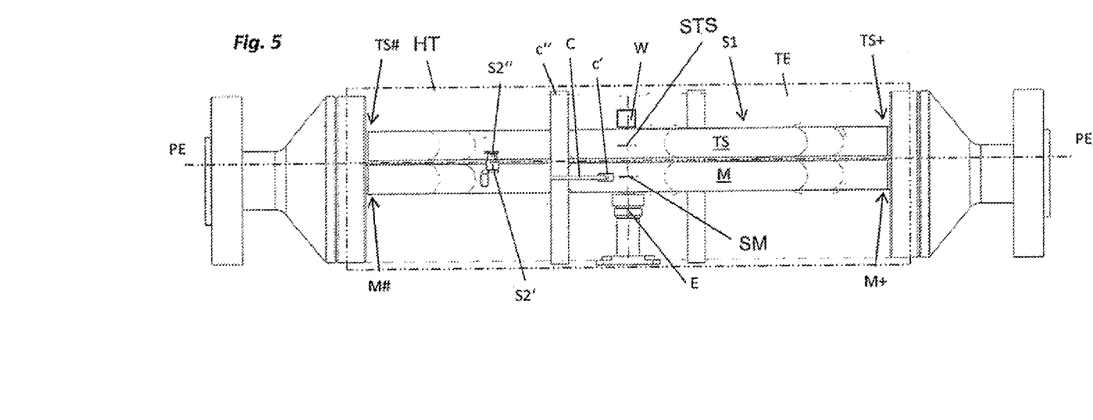
Figure 6:
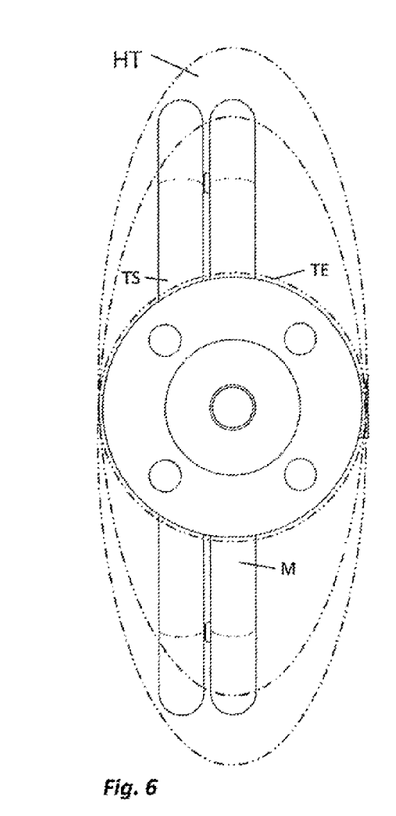

The measuring tube M is according to an additional embodiment of the invention—such as directly evident from the combination of FIGS. 2, 3 and 4—point symmetrically embodied relative to a symmetry center SM, and can, consequently, be, for example, straight or, at least in a middle section, also curved in an S, respectively Z, shape, in given cases, also in a manner such that—such as also evident from FIG. 4—alternately arc shaped tube sections and straight tube sections are arranged serially with respect to one another. This has, among other things, the advantage that, for the mentioned case, in which oscillations of the (such as here, single) measuring tube with three oscillation antinodes serve as wanted oscillations, the measuring transducer, such as already disclosed in the initially mentioned U.S. Pat. No. 7,077,014, can also be so embodied that no, or at least no mentionable, transverse forces are produced by the wanted oscillations of the measuring tube—even in the case of density changing in considerable measure as a function of time—, consequently no associated disturbances of the Coriolis oscillations need to be taken care of.

For additionally improving the oscillatory behavior, not least of all also for additional lessening of the aforementioned transverse forces, the measuring transducer is in another embodiment of the invention supplementally equipped with a spring element C, which is mechanically coupled both with the measuring tube as well as also with the first support element in such a manner that it is deformed elastically during operation as a result of a movement of the measuring tube relative to the first support element. For such purpose, the spring element is mechanically connected with a first end C+ with the measuring tube M, for example, at a securement point c' lying on an imaginary circularly shaped peripheral line of the measuring tube M also imaginarily contacting the first exciter component E', and with a second end C# with the support element TE, for example, at a securement point c" laterally spaced from the second exciter component E". In such case, the first end C+ of the spring element C and the measuring tube M are connected with one another as rigidly as possible, namely in a manner excluding relative movements of said end C+ and of the measuring tube, respectively the second end C# of the spring element C and the support element TE are connected with one another as rigidly as possible, namely in a manner excluding relative movements of said end and of the support element TE. The spring element C can be formed, for example, by means of a helical spring or, however, also—such as directly evident from a combination of FIGS. 2-5—by means of a leaf spring, which is connected with the measuring tube—to form the securement point c'—by means of a first holder affixed to the measuring tube by material bonding, and with the support element TE—to form the securement point c"—by means of a rod shaped, second holder affixed to the support element TE by material bonding. As already shown in the initially mentioned U.S. Pat. No. 7,077,014, the measuring transducer MT can be trimmed by means of the spring element C additionally even in such a manner that, as a result, —such as also symbolized in FIG. 7 by the continuous line—the transverse forces developed by the wanted oscillations of the measuring tube can completely neutralize one another, so that no mentionable transverse forces are produced by the measuring transducer MT and transmitted to the connected pipeline.

Particularly for the mentioned case, in which the support element TS is embodied as a blind tube, the support element TS and the measuring tube M are—such as also directly evident from a combination of FIGS. 2-6—embodied in advantageous manner essentially to be of equal construction at least as regards their outer contours, but preferably, however, also as regards all dimensions, respectively also as regards the materials from which they are, in each case, produced. In accordance therewith, also the support element TS has—equally as the measuring tube M—in an additional embodiment of the invention a symmetry center STS, relative to which also the support element TS is point symmetric. Measuring tube M and support element TS are in advantageous manner, furthermore, so embodied and arranged point symmetrically that—such as also directly evident from the combination of FIGS. 4 and 5—the symmetry center SM of the measuring tube M and the symmetry center STS of the support element TS coincide at least in an imaginary projection plane PE of the measuring transducer extending between the measuring tube M and the support element TS, especially a plane parallel to the measuring tube M and/or to the support element TS. Consequently, an inner part of the measuring transducer formed by means of measuring tube M and support element TS is likewise point symmetric relative to a symmetry center lying in said imaginary projection plane PE. According to an additional embodiment of the invention, the support element TS is additionally formed by means of a blind tube (namely a tube which is blind in that the medium to be measured cannot flow through it) extending at least sectionally parallel to the measuring tube M, in such a manner that—such as also directly evident from FIG. 5, respectively 6—a minimal separation between measuring tube and said support element is constant at least over a region extending between the first oscillation sensor and the oscillation exciter. According to another embodiment of the invention, both the measuring tube as well as also the support element TS are embodied at least sectionally curved with S, respectively Z, shape and/or at least sectionally straight; this, especially, in such a manner that, such as directly evident from a combination of FIGS. 2-6, measuring tube M and support element TS, at least as regards their outer contours, especially, however, also as regards the respectively used materials and/or as regards their total geometry, are of equal construction. In accordance therewith, the support element TS can in simple manner be formed e.g. also by means of a cylindrical tube with a tube wall and a lumen surrounded by said tube wall, for instance, also in such a manner that the lumen of the measuring tube M and the lumen of the tube forming the support element TS are equally large, and/or that a wall thickness of the tube wall of the tube forming the support element TS and the wall thickness of the tube wall of the measuring tube M are equally large. Consequently, measuring tube M and support element TS can be produced by means of two essentially equal tubes.

The support element TE includes in the example of an embodiment shown here, furthermore, a first endpiece TE' forming the first support end TE+ and formed, for example, by means of a plate or a funnel, a second endpiece TE" forming the second support end TE# and formed, for example, by means of a plate or a funnel, as well as an intermediate piece TE''', especially a cylindrical and/or tubular intermediate piece TE''', extending between the two, ideally equally constructed, endpieces TE', TE". Said intermediate piece TE''', consequently the therewith manufactured support element TE, can, such as in the example of an embodiment shown here, accordingly also be formed—by means of a—here at least sectionally cylindrical, respectively tubularly formed—hollow body, for example, in such a manner that said support element TE—formed by means of a tube, ideally a cylindrical tube having a tube wall, especially a metal tube wall, for example, a tube wall of steel, as well as a lumen surrounded by said tube wall, —encases both the measuring tube M as well as also the support element TS at least partially, and consequently has a lumen, through which both the measuring tube M as well as also the support element TS, in each case, at least partially extend. In the case of a comparatively wide protrusion, namely a lateral protrusion of the curved measuring tube M, respectively support element TS, beyond the support element TE, then obviously corresponding lateral openings are provided in a side wall of such a tube body serving ultimately as support element TE, so that measuring tube M, respectively support element TS, can protrude beyond the wall of the support element TE. The support element TE can—such as quite usual in the case of components of measuring transducers of the type being discussed—be made, for example, of a stainless steel.

The support element TE can, furthermore, serve—for instance, correspondingly at least sectionally cylindrical—as a housing of the measuring transducer for jacketing the measuring tube and support element TS together and, in given cases, completed by means of corresponding housing caps for the possibly laterally protruding sections of the measuring tube M and the support element TS. The support element TE can, however, also, such as directly evident from a combination of FIGS. 1-6, be embodied as a self sufficient component of the measuring transducer MT—and then be manufacturable directly e.g. also from a comparatively cost effective, free-machining or structural steel—, which together with the other components of the measuring transducer, especially also the measuring tube M and the support element TS, are accommodated in a measuring transducer housing HT likewise formed as a separate component of the measuring transducer MT—here principally serving as a protective shell hermetically sealing the interior of the measuring transducer MT relative to the surrounding atmosphere. In given cases, the measuring transducer housing HT is also pressure and/or explosion resistant. The measuring transducer housing HT can be manufactured, for example, of a smooth or even textured for reinforcement, stainless steel sheet or even a synthetic material, such as a plastic. Furthermore, the measuring transducer housing HT can, such as also indicated in FIG. 1, have a corresponding connection nozzle, to which the electronics housing HE is mounted to form a measuring device of compact construction. Arranged within the connection nozzle can be, furthermore, a hermetically sealed and/or pressure resistant guide, for example, manufactured by means of glass and/or plastic potting compound, for electrical connection wires extending between the measuring device electronics and the measuring transducer.

For registering oscillations of the measuring tube M, not least of all also the wanted oscillations, respectively the Coriolis oscillations, the measuring transducer includes further a first oscillation sensor S1, especially an electrodynamic first oscillation sensor S1, electrically connected to the measuring device electronics, for example, by means of an additional pair of connection wires—here likewise not shown for reasons of perspicuity. Oscillation sensor S1 is, in such case, adapted to deliver a first oscillatory signal s1 representing oscillations, here inlet-side oscillations, of the at least one measuring tube, in such a manner that said oscillatory signal s1 has a wanted signal component with a signal frequency corresponding to the wanted frequency. For such purpose, the oscillation sensor S1 is so embodied in the example of an embodiment shown here that therewith—here inlet-side—movements of the measuring tube M relative to the support element TS, not least of all also movements of oscillations of the measuring tube with wanted frequency $f_N$, are registered, for example, in that said movements are converted into a signal voltage serving as first oscillatory signal, and, consequently, having the wanted signal component. The oscillation sensor S1 includes, consequently, in the example of an embodiment shown here, a first sensor component S1' affixed externally on the measuring tube M, for example, connected with its tube wall by material bonding and/or formed by means of a permanent magnet, as well as a second sensor component S1" mounted on the support element TS, and formed, for example, by means of a cylindrical coil. Moreover, in the case of the measuring transducer of the invention, furthermore, a second oscillation sensor S2 is provided, for example, an again electrodynamic, second oscillation sensor S2, respectively a second oscillation sensor S2 constructed equally to the first oscillation sensor S1. Said oscillation sensor S2 includes—such as directly evident from a combination of FIGS. 3 and 5—in the example of an embodiment shown here, a first sensor component S2' affixed externally on the measuring tube M and spaced from the sensor component S1' of the oscillation sensor S1, for example, namely also a first sensor component S2' formed by means of a permanent magnet and/or equally constructed to the sensor component of the first oscillation sensor, as well as a second sensor component S2" mounted spaced on the support element TS from the second sensor component S1" of the oscillation sensor S1, for example, a second sensor component S2" formed by means of a cylindrical coil and/or equally constructed to the sensor component S1" of the oscillation sensor S1. Equally as the oscillation sensor S1, also the oscillation sensor S2 is adapted to register movements of the measuring tube M relative to the support element TS, for instance, also movements of oscillations of the measuring tube M with the wanted frequency, and to transduce such movements into a second oscillatory signal s2 representing oscillations of the measuring tube M and having also a wanted signal component with a signal frequency corresponding to the wanted frequency, and, indeed, in such a manner that—because of the Coriolis oscillations—a corresponding travel time difference $\Delta t$, respectively a phase difference $\Delta\phi=2\pi \cdot f_N \cdot \Delta t$ is measurable between the wanted signal component of the first oscillation signal s1 and the wanted signal component of the second oscillation signal s2 corresponding with a mass flow rate of a medium flowing in the lumen of the measuring tube, based on which thus the measuring device electronics ME can ascertain the mass flow rate, respectively mass flow, of the medium. According to an additional embodiment of the invention, it is, furthermore, provided that the measuring transducer MT has, except for the first and second oscillation sensors S1, S2, no (additional) oscillation sensor having a sensor component mounted on the support element TS.

The measuring device electronics ME is additionally adapted to receive the first and second oscillatory signals and based on said oscillation signals s1, s2 to generate at least one mass flow, measured value $X_m$ representing the mass flow rate. Furthermore, the measuring device electronics ME is also adapted to generate, at least at times, an electrical exciter signal e—for example, one controlled to a predetermined voltage level and/or to a predetermined electrical current level—for the oscillation exciter E—for example, an electrodynamic oscillation exciter E, namely one formed by means of a plunging armature, or solenoid, coil—, which has an excitation frequency, namely a signal frequency corresponding to the wanted frequency, and which serves to feed the oscillation exciter E controllably at least with the electrical power required for exciting, respectively maintaining, the wanted oscillations, and which accordingly has a signal frequency corresponding to the (instantaneous) resonant frequency of the wanted mode, consequently the wanted frequency. The oscillation exciter E, in such case, converts an electrical excitation power fed by means of the electrical exciter signal into, e.g. pulsating or harmonic, namely essentially sinusoidal, exciter forces, which act correspondingly on the measuring tube and, thus, actively excite the desired wanted oscillations. For example, the exciter signal e can, in such case, simultaneously have also a plurality of sinusoidal signal components with signal frequencies different from one another, of which one signal component—, for instance, a signal component dominating at least at times as regards signal power—has the signal frequency corresponding to the wanted frequency. The exciter forces ultimately generated by conversion of electrical excitation power fed into the oscillation exciter E can, in such case, in manner known per se to those skilled in the art, correspondingly be produced, namely by means of a driver circuit provided in the measuring device electronics ME and providing the exciter signal based on the signal frequency and signal amplitude of the at least one sensor signal in, and via, an output channel. For ascertaining the instantaneous resonant frequency of the wanted mode, respectively for tuning the corresponding signal frequency of the exciter signal, there can be provided in the driver circuit, for example, a digital, phase control loop (PLL, or phase locked loop), while an electrical current level of the exciter signal determinative of magnitude of said exciter forces can be suitably set, for example, by means of a corresponding electrical current controller of the driver circuit. The measuring device electronics ME can here e.g. also be embodied to control the exciter signal in such a manner that the resonant oscillations have a constant amplitude, consequently are largely independent of the density p, respectively also the viscosity r, of the respective medium to be measured. The construction and application of the aforementioned phase control loop for the actively exciting, vibratory elements of the type being discussed to an instantaneous resonant frequency is described at length e.g. in U.S. Pat. No. 4,801,897. Of course, also other driver circuits known per se to those skilled in the art, for example, also from the initially mentioned U.S. Pat. No. 4,801,897, U.S. Pat. No. 5,024,104, respectively U.S. Pat. No. 6,311,136, to be suitable for tuning the exciter energy, respectively the excitation power, can be used. Moreover, the measuring device electronics can, furthermore, also be adapted, for instance, based on a wanted signal component of at least one of the oscillation signals and/or based on the exciter signal, to measure a density and/or a viscosity of the medium.

As already mentioned, the wanted oscillations of the at least one measuring tube excited during operation of the measuring transducer lead to the fact that said measuring tube, in the case of medium flowing simultaneously therethrough, supplementally executes Coriolis oscillations, namely experiences supplementally bending oscillations synchronized with the bending oscillations corresponding to the wanted oscillations. The bending oscillations corresponding to the Coriolis oscillations, in turn, cause the particular measuring tube to have at times, namely likewise in the rhythm of the wanted frequency, periodically recurringly, additional circular arc shaped regions with time changing curvatures $1/r_C$, respectively time changing radii of curvature re, with the result that induced there by the flowing medium are besides the Coriolis forces additionally also corresponding centrifugal forces; wherein for a mass m moved on a peripheral circular path $2\pi \cdot r$ with a velocity v a magnitude of the centrifugal force results, as is known, corresponding to the formula $m \cdot v^2/r$. Said centrifugal forces—here thus centrifugal forces resulting from time changing curvatures of the at least one measuring tube—lead, in turn, to the fact that—such as also schematically shown in FIG. 9—superimposed on the Coriolis oscillations are supplementally centrifugal oscillations, likewise with the wanted frequency. As a result, the phase difference $\Delta\phi$ between the wanted signal component of the first oscillation signal and the wanted signal component of the second oscillation signal is thus not only dependent on a measurement effect of first type, namely the Coriolis oscillations superimposed on the wanted oscillations, but also on a measurement effect of second type, namely the centrifugal oscillations superimposed on the Coriolis oscillations. Consequently, the phase difference $\Delta\phi$ includes thus both a Coriolis fraction $\Delta\phi_C$ representing the measurement effect of first type as well as also a centrifugal fraction $\Delta\phi_Z$ representing the measurement effect of second type. With sufficiently exact approximation, it can, in such case, be assumed that—such as also shown schematically in FIG. 9—said phase difference $\Delta\phi$ corresponds to a simple addition $\Delta\phi_C + \Delta\phi_Z + \Delta\phi_0$ of the Coriolis fraction $\Delta\phi_C$ and the centrifugal fraction $\Delta\phi_Z$ plus a scale zero point, namely a phase difference $\Delta\phi_0$ existing between the wanted signal components of the sensor signals in the case of measuring tube vibrating in the wanted mode, consequently with wanted frequency $f_N$, however, with no medium flowing through it. Said measurement effect of second type reaches, especially in the case of measuring transducers, in the case of which the at least one measuring tube has a caliber of less than 50 mm, respectively in the case of measuring transducers with a nominal cross section of $0.25 \cdot \pi \cdot DN^2$ of less than 2000 mm$^2$, such a size that—to the extent that it is not correspondingly taken into consideration, namely correspondingly corrected, in the case of ascertaining the mass flow rate—the required high accuracy of measurement can no longer be assured; this not least of all also because especially measuring transducers with the aforementioned configurations have most often measuring tubes with, in each case, a comparatively high oscillatory length to wall thickness ratio, respectively most often also a rather high sensitivity $E = \Delta\phi_C/m$, respectively a correspondingly high area-normalized sensitivity E', defined as a ratio $(0.25 \cdot \pi \cdot DN^2) \cdot \Delta\phi_C/m$ of the Coriolis fraction $\Delta\phi_C$ of the phase difference to an area-normalized, namely referenced to the nominal cross section $0.25 \cdot \pi \cdot DN^2$ of the measuring transducer, mass flow rate $m'=m/(0.25 \cdot \pi \cdot DN^2)$ of more than 10 rad $kg^{-1} \cdot s \cdot mm^2$. Further investigations have shown that the instantaneous measurement effect of second type as a function of the instantaneous mass flow rate m, the instantaneous density ρ of the medium flowing in the at least one measuring tube, as well as the therefrom resulting, instantaneous phase difference Δφ can be quantitatively approximated by the polynomial function $$\Delta \varphi_z = (\Delta \varphi - \Delta \varphi_0) \cdot m^2 \cdot \sum_{i=0}^{M} (D_i \cdot \rho^{i-1}) \quad (1)$$

defined by measuring device specific, consequently earlier experimentally determinable, coefficients $D_0, D_1, \ldots D_M$. These coefficients are determined, for instance, by calibrating the respective measuring device at different densities and mass flow rates and/or by computer based simulations. Through experiments, it could be further determined that a polynomial degree M of said polynomial function should be chosen, in each case, greater than or equal to 0, in such a manner that, in any event, the coefficient $D_0$ is different from zero ($D_0 \neq 0$), respectively that for most applications very precise estimations of the centrifugal fraction $\Delta \varphi_Z$ are already achievable by means of said polynomial function at a polynomial degree of 0, 1 or 2. Additionally, it could, furthermore, be determined that it suffices for most measuring transducers, respectively measuring transducer types, to use coefficients $D_0, D_1, \ldots D_M$ of the polynomial function ascertained experimentally, first of all, for an individual, representative measuring transducer, for other, equally constructed measuring transducers, so that said equally constructed measuring transducers must no longer be calibrated anew, which means a considerable reduction of the calibration effort relative to the polynomial function.

Taking this into consideration, the measuring device electronics of the Coriolis mass flow measuring device of the invention is, especially, also adapted to take into consideration a dependence of the phase difference Δφ existing between the wanted signal component of the first oscillation signal and the wanted signal component of the second oscillation signal on the measurement effect of second type, namely correspondingly to compensate during operation using information contained in the oscillation signals, so that the mass flow, measured value $X_m$ is, as a result, a linear function of the Coriolis fraction $\Delta \varphi_C$ of the phase difference; this e.g. also in such a manner that a mass flow, measured value $X_m$ generated by means of the measuring device electronics fulfills one of the following conditions co-determined, in each case, through a measuring device specific coefficient $C_1 = m/\Delta \varphi_C = 1/E$ corresponding to the sensitivity E:

$$X_m = \frac{(\Delta \varphi - \Delta \varphi_z - \Delta \varphi_0)}{2\pi \cdot f_N} \cdot C_1 \quad (2)$$

respectively, $$X_m = \frac{\Delta \varphi_C}{2\pi \cdot f_N} \cdot C_1 \quad (3)$$

and/or also a condition co-determined by a measuring device specific coefficient $C_0 = C_1 \cdot \Delta \varphi_0/(2\pi \cdot f_N)$ corresponding to the scale zero point:

$$X_m = \frac{(\Delta \varphi - \Delta \varphi_z)}{2\pi \cdot f_N} \cdot C_1 + C_o \quad (4)$$

wherein the therein contained measuring device specific coefficients $C_1$, respectively $C_0$ are earlier ascertainable in manner known to those skilled in the art by calibrating the measuring device by means of a medium of known density allowed to flow at different known mass flow rates. Accordingly, the measuring device electronics is, according to an additional embodiment of the invention, adapted, for generating the mass flow, measured value $X_m$, to ascertain the Coriolis fraction $\Delta \varphi_C$ of the phase difference Δφ, respectively to ascertain the centrifugal fraction $\Delta \varphi_Z$ of the phase difference Δφ and thereafter to subtract such from the equally ascertained phase difference Δφ (together with the scale zero point), in order so to ascertain the Coriolis fraction $\Delta \varphi_C$ of the phase difference Δφ; this, for example, also in that the measurement device electronics generates during operation, using the first and second oscillation signals, a total phase measured value $X_\varphi$ representing the phase difference Δφ reduced by the scale zero point and/or a Coriolis phase measured value $X_{\varphi C}$ representing the Coriolis fraction $\Delta \varphi_C$ of the phase difference Δφ and/or a centrifugal phase measured value $X_\varphi z$ representing the centrifugal fraction $\Delta \varphi_Z$ of the phase difference Δφ. Considering the above mentioned relation between the phase difference Δφ and its respective Coriolis and centrifugal fractions, the total phase measured value $X_\varphi$, the Coriolis phase measured value $X_{\varphi C}$, respectively the centrifugal phase measured value $X_{\varphi Z}$ is so calculated by means of the measuring device electronics that one of the conditions $$X_\varphi = \Delta\varphi - \Delta\varphi_0, \quad (5)$$

$$X_{\varphi Z} = \Delta\varphi - \Delta\varphi_C - \Delta\varphi_0 \quad (6)$$

respectively, $$X_{\varphi C} = \Delta\varphi - \Delta\varphi_Z - \Delta\varphi_0 \quad (7).$$

is correspondingly fulfilled. In corresponding manner, thus, the Coriolis fraction corresponding to the measurement effect of first type actually of interest for measuring the mass flow rate can also be directly ascertained based on the polynomial function (1) and the aforementioned condition (7), namely according to the polynomial function:

$$\Delta \varphi_C = \Delta \varphi - \Delta \varphi_0 - \Delta \varphi_z = (\Delta \varphi - \Delta \varphi_0) \cdot \left[ 1 - \cdot m^2 \cdot \sum_{i=0}^{M} (D_i \cdot \rho^{i-1}) \right] \quad (8)$$

$(M \geq 0)$.

The knowledge concerning the actual density ρ of the medium flowing, in each case, instantaneously in the at least one measuring tube required for ascertaining the centrifugal fraction $\Delta \varphi_Z$ induced by the measurement effect of first type, respectively the Coriolis fraction $\Delta \varphi_Z$ induced by the measurement effect of second type, can be directly achieved during operation, for example, based on the relation $$f_N^2 = \frac{B}{\rho - A}, \quad (9)$$

according to which the dependence of the wanted frequency $f_N$ (for instance, determined by the excitation frequency of the exciter signal and/or determinable from the signal frequency of at least one of the wanted signal components) on the density ρ of the flowing medium is, as is known, approximateable very precisely. Therefore, the measuring device electronics ME is, according to an additional embodiment of the invention, furthermore, adapted during operation to ascertain a frequency measured value $X_f$ representing the wanted frequency as well as to use said frequency measured value $X_f$ in the ascertaining of the mass flow, measured value $X_m$. Alternatively thereto or in supplementation thereof, the measuring device electronics can also be adapted, based on the excitation frequency of the exciter signal and/or the signal frequency of at least one of the wanted signal components, to ascertain a density measured value $X_\rho$ representing the density ρ of the medium, for example, in such a manner that said density measured value $X_\rho$ fulfills the condition $$X_\rho = A + \frac{B}{f_N^2} \tag{10}$$

and additionally also to generate the mass flow, measured value $X_m$ using the density measured value $X_\rho$. The therein contained, measuring device specific coefficients A and B can, in turn, be earlier ascertained in manner known to those skilled in the art by calibrating the measuring device using different media with different densities.

Accordingly, the measurement effect of second type can be taken into consideration, respectively compensated, in the ascertaining of the mass flow, measured value $X_m$, for example, by ascertaining said mass flow, measured value $X_m$ based on the formula $$X_m = \frac{(X_\varphi - X_{\varphi Z})}{2\pi \cdot X_f} \cdot C_1 \tag{11}$$

respectively.

$$X_m = \frac{X_{\varphi C}}{2\pi \cdot X_f} \cdot C_1. \tag{12}$$

Because, on the one hand, the measurement effect of second type—such as earlier mentioned—has, besides the dependence on the density ρ supplementally also a dependence on the mass flow rate m of the medium flowing through the at least one measuring tube vibrating in the wanted mode, as well as also the then induced measurement effect of first type produces, on the other hand, however, in comparison to said measurement effect of first type, respectively the therewith induced Coriolis fraction $\Delta\varphi_C$ of the phase difference $\Delta\varphi$, a very much smaller contribution to the ultimately measured phase difference $\Delta\varphi$, —based on the polynomial function (1)—the centrifugal fraction $\Delta\varphi_Z$, respectively—based on the polynomial function (8)—the Coriolis fraction $\Delta\varphi_C$ can with sufficient accuracy be approximated quantitatively very simply, with sufficient accuracy for most applications, also based on the aforementioned operating parameters, phase difference $\Delta\varphi$ and wanted frequency $f_N$, respectively by means of the measured values, total phase measured value $X_\varphi$ and frequency measured value $X_f$, corresponding to said operating parameters. The centrifugal phase measured value $X_{\varphi Z}$ and/or the Coriolis phase measured value $X_{\varphi C}$ can then be so calculated that therewith the condition $$X_{\varphi Z} = (\Delta\varphi - \Delta\varphi_0) \cdot \left\{ \left[ \frac{(\Delta\varphi - \Delta\varphi_0) \cdot C_1}{2\pi \cdot f_N} \right]^2 \cdot \sum_{i=0}^{M} \left[ D_i \cdot \left( A + \frac{B}{f_N^2} \right)^{i-1} \right] \right\} \tag{13}$$

$(M \geq 0)$ respectively the condition $$X_{\varphi C} = \tag{14}$$

$$(\Delta\varphi - \Delta\varphi_0) \cdot \left\{ 1 - \left[ \frac{(\Delta\varphi - \Delta\varphi_0) \cdot C_1}{2\pi \cdot f_N} \right]^2 \cdot \sum_{i=0}^{M} \left[ D_i \cdot \left( A + \frac{B}{f_N^2} \right)^{i-1} \right] \right\}$$

$(M \geq 0)$ is fulfilled, for example, thus based on the formula:

$$X_{\varphi Z} = X_\varphi \cdot \left[ \left( \frac{X_\varphi \cdot C_1}{2\pi \cdot X_f} \right)^2 \right] \cdot \sum_{i=0}^{M} \left[ D_i \cdot \left( A + \frac{B}{X_f^2} \right)^{i-1} \right] (M \geq 0) \tag{15}$$

respectively the formula:

$$X_{\varphi C} = X_\varphi \cdot \left\{ 1 - \left( \frac{X_\varphi \cdot C_1}{2\pi \cdot X_f} \right)^2 \cdot \sum_{i=0}^{M} \left[ D_i \cdot \left( A + \frac{B}{X_f^2} \right)^{i-1} \right] \right\} \tag{16}$$

$(M \geq 0)$.

As a result, formula (12) for the mass flow, measured value $X_m$ can, for example, also be expressed in the form:

$$X_m = \frac{X_\varphi}{2\pi \cdot X_f} \cdot C_1 \cdot \left\{ 1 - \left( \frac{X_\varphi \cdot C_1}{2\pi \cdot X_f} \right)^2 \cdot \sum_{i=0}^{M} \left[ D_i \cdot \left( A + \frac{B}{X_f^2} \right)^{i-1} \right] \right\} \tag{17}$$

$(M \geq 0)$ respectively taking into consideration also the formula (10) for the density measured value $X_\rho$, thus, for example, also in the form:

$$X_m = \frac{X_\varphi}{2\pi \cdot X_f} \cdot C_1 \cdot \left\{ 1 - \left( \frac{X_\varphi \cdot C_1}{2\pi \cdot X_f} \right)^2 \cdot \sum_{i=0}^{M} [D_i \cdot X_\rho^{i-1}] \right\} (M \geq 0). \tag{18}$$

The invention claimed is:
1. A Coriolis mass flow measuring device, comprising:
a measuring device electronics; as well as
a measuring transducer electrically connected with said measuring device electronics, wherein the measuring transducer comprises:
at least one measuring tube, for conveying a flowable medium;

an oscillation exciter for exciting and maintaining oscillations of said at least one measuring tube;

a first oscillation sensor for registering oscillations, of said at least one measuring tube;

a second oscillation sensor spaced along the measuring tube from the first oscillation sensor for registering oscillations, of the at least one measuring tube;

said measuring tube is adapted to be flowed through by a medium having a density and a mass flow rate and during that to be caused to vibrate in such a manner that it executes wanted oscillations, namely bending oscillations having a wanted frequency, corresponding to a resonant frequency of the measuring transducer, which wanted oscillations are suitable to induce in the flowing medium Coriolis forces dependent on its mass flow rate;

said Coriolis forces are suitable to bring about a measurement effect of a first type, namely Coriolis oscillations of the wanted frequency superimposed on the wanted oscillations, said Coriolis oscillations are suitable to induce in the medium centrifugal forces dependent on its mass flow rate, m, and on its density, $\rho$;

said centrifugal forces are suitable to bring about a measurement effect of a second type, namely centrifugal oscillations of the wanted frequency superimposed on the Coriolis oscillations;

said measuring device electronics is adapted for exciting the wanted oscillations of said measuring tube to generate for driving said oscillation exciter an exciter signal, which has an excitation frequency, namely a signal frequency, corresponding to the wanted frequency;

said oscillation exciter is adapted to excite by means of the exciter signal the wanted oscillations of said at least one measuring tube;

said first oscillation sensor is adapted to deliver a first oscillatory signal representing oscillations of said at least one measuring tube, in such a manner that said oscillatory signal includes a wanted signal component with a signal frequency corresponding to the wanted frequency;

said second oscillation sensor is adapted to deliver a second oscillatory signal representing oscillations of said at least one measuring tube in such a manner that said oscillatory signal includes a wanted signal component with a signal frequency corresponding to the wanted frequency and that between the wanted signal component of the first oscillation signal and the wanted signal component of the second oscillation signal a phase difference exists dependent both on the measurement effect of first type as well as also on the measurement effect of second type, namely a phase difference having both a Coriolis fraction representing the measurement effect of first type as well as also a centrifugal fraction representing the measurement effect of second type; and said measuring device electronics is adapted to receive the first and second oscillatory signals, and to generate based on the first and second oscillatory signals, at least one mass flow measured value representing the mass flow rate, in such a manner that a dependence of said phase difference on the measurement effect of second type is taken into consideration.

2. The Coriolis mass flow measuring device as claimed in claim 1, wherein:

said measuring device electronics is adapted to ascertain the phase difference, for generating the mass flow, measured value, $X_m$; and/or said measuring device electronics is adapted to ascertain the centrifugal fraction, $\Delta\varphi z$, of the phase difference; for generating the mass flow, measured value, $X_m$ and/or said measuring device electronics is adapted to ascertain the Coriolis fraction, of the phase difference, $\Delta\varphi$, for generating the mass flow, measured value, $X_m$.

3. The Coriolis mass flow measuring device as claimed in claim 1, wherein:

said measuring device electronics is adapted by application of the first and second oscillation signals to ascertain a total phase measured value, $X_\varphi$, which represents a phase difference reduced by a scale zero point, namely a phase difference, $\Delta\varphi_0$, existing between the wanted signal components of the sensor signals for a measuring tube vibrating with the wanted frequency but not flowed through by medium, especially in such a manner that said total phase measured value, $X_\varphi$, fulfills the condition $X_\varphi = \Delta\varphi - \Delta\varphi_0$; and said measuring device electronics is adapted to generate the mass flow, measured value, $X_m$, by means of the total phase measured value, $X_\varphi$.

4. The Coriolis mass flow measuring device as claimed in claim 3, wherein:

said measuring device electronics is adapted so to ascertain the mass flow, measured value, $X_m$, that said mass flow, measured value fulfills a condition:

$$X_m = \frac{(\Delta\varphi - \Delta\varphi_Z - \Delta\varphi_0)}{2\pi \cdot f_N} \cdot C_1.$$

5. The Coriolis mass flow measuring device as claimed in claim 3, wherein:

said measuring device electronics is adapted so to generate the centrifugal phase measured value, $X_{\varphi Z}$, that such fulfills a condition $$X_{\varphi Z} = \Delta\varphi - \Delta\varphi_C - \Delta\varphi_0.$$

6. The Coriolis mass flow measuring device as claimed in claim 3, wherein:

said measuring device electronics is adapted so to generate the Coriolis phase measured value, $X_{\varphi C}$, that such fulfills a condition:

$$X_{\varphi C} = \Delta\varphi - \Delta\varphi_Z - \Delta\varphi_0;$$

and/or a condition:

$$X_{\varphi C} = (\Delta\varphi - \Delta\varphi_0) \cdot \left\{ 1 - \left[\frac{(\Delta\varphi - \Delta\varphi_0) \cdot C_1}{2\pi \cdot f_N}\right]^2 \cdot \sum_{i=0}^{M} \left[D_i \cdot \left(A + \frac{B}{f_N^2}\right)^{i-1}\right] \right\}$$

$(M \geq 0)$ co-determined by said measuring device specific coefficients A, B, $C_1$, $D_0$.

7. The Coriolis mass flow measuring device as claimed in claim 1, wherein:

said measuring device electronics is adapted to generate by application of the first and second oscillation signals a centrifugal phase measured value, $X_{\varphi Z}$, representing the centrifugal fraction, $\Delta\varphi z$, of the phase difference, $\Delta\varphi$; and said measuring device electronics is adapted to generate the mass flow, measured value, by means of the centrifugal phase measured value, $X_{\varphi Z}$.

8. The Coriolis mass flow measuring device as claimed in claim 1, wherein:
said measuring device electronics is adapted to generate by application of said first and second oscillation signals a Coriolis phase measured value, $X_{\varphi C}$, representing the Coriolis fraction, $\Delta \varphi c$, of the phase difference, $\Delta \varphi$; and
said measuring device electronics is adapted to generate the mass flow, measured value, $X_m$, by means of the Coriolis phase measured value, $X_{\varphi C}$.

9. The Coriolis mass flow measuring device as claimed in claim 8, wherein:
said measuring device electronics is adapted to generate the mass flow, measured value, $X_m$, according to a formula $$X_m = \frac{X_{\varphi C}}{2\pi \cdot X_f} \cdot C_1$$

co-determined by a measuring device specific coefficient $C_1$.

10. The Coriolis mass flow measuring device as claimed in claim 8, wherein:
said measuring device electronics is adapted to generate the Coriolis phase measured value, $X_{\varphi C}$, by means of the frequency measured value, $X_f$, and the total phase measured value, $X_\varphi$, especially in such a manner that therewith a condition $$X_{\varphi C} = (\Delta\varphi - \Delta\varphi_0) \cdot \left\{ 1 - \left[\frac{(\Delta\varphi - \Delta\varphi_0) \cdot C_1}{2\pi \cdot f_N}\right]^2 \cdot \sum_{i=0}^{M}\left[D_i \cdot \left(A + \frac{B}{f_N^2}\right)^{i-1}\right]\right\}$$

$(M \geq 0)$ co-determined by measuring device specific coefficients A, B, $C_1$, $D_0$ is fulfilled, and/or according to a formula $$X_{\varphi C} = X_\varphi \cdot \left\{ 1 - \left(\frac{X_\varphi \cdot C_1}{2\pi \cdot X_f}\right)^2 \cdot \sum_{i=0}^{M}\left[D_i \cdot \left(A + \frac{B}{X_f^2}\right)^{i-1}\right]\right\} \ (M \geq 0)$$

co-determined by measuring device specific coefficients A, B, $C_1$, $D_0$.

11. The Coriolis mass flow measuring device as claimed in claim 1, wherein:
said measuring device electronics is adapted to ascertain based on the excitation frequency of the exciter signal and/or the signal frequency of at least one of the wanted signal components a frequency measured value, $X_f$, representing the wanted frequency; and
said measuring device electronics is adapted to generate the mass flow, measured value, $X_m$, by means of the frequency measured value, $X_f$.

12. The Coriolis mass flow measuring device as claimed in claim 1, wherein:
said measuring device electronics is adapted to ascertain based on the excitation frequency of the exciter signal and/or the signal frequency of at least one of the wanted signal components a density measured value, $X_\rho$, representing the density of the medium, especially in such a manner that said density measured value, $X_\rho$, fulfills a condition $$X_\rho = A + \frac{B}{f_N^2}$$

co-determined by measuring device specific coefficients A, B; and
said measuring device electronics is adapted to generate the mass flow, measured value, $X_m$, by means of the density measured value, $X_\rho$, especially according to a formula $$X_m = \frac{X_\varphi}{2\pi \cdot X_f} \cdot C_1 \cdot \left\{ 1 - \left(\frac{X_\varphi \cdot C_1}{2\pi \cdot X_f}\right)^2 \cdot \sum_{i=0}^{M}[D_i \cdot X_\rho^{i-1}]\right\} \ (M \geq 0)$$

co-determined by measuring device specific coefficients $C_1$, $D_0$.

13. The Coriolis mass flow measuring device as claimed in claim 1, wherein:
said at least one measuring tube has a caliber, which is less than 50 mm, especially less than 20 mm; and/or
said measuring transducer has a nominal cross section, $0.25 \cdot \pi \cdot DN^2$, of less than 2000 mm², together with an area-normalized sensitivity E' of greater than 10 rad $kg^{-1} \cdot s \cdot mm^2$, defined as a ratio, $(0.25 \cdot \pi \cdot DN^2) \cdot \Delta\varphi_c/m$, of the Coriolis fraction of the phase difference, $\Delta\varphi$, to an area-normalized mass flow rate, m', namely one normalized with reference to the nominal cross section, $0.25 \cdot \pi \cdot DN^2$, of the measuring transducer.

14. The Coriolis mass flow measuring device as claimed in claim 1, wherein: the measuring device electronics is adapted to generate said at least one mass flow measured value in such a manner that the dependence of said phase difference on the measurement effect of second type is compensated.

15. The Coriolis mass flow measuring device as claimed in claim 1, wherein: the at least one measuring tube is at least sectionally curved.

16. The Coriolis mass flow measuring device as claimed in claim 1, wherein: the first oscillation sensor is adapted to register inlet-side oscillations, of said at least one measuring tube.

17. The Coriolis mass flow measuring device as claimed in claim 1, wherein: the second oscillation sensor is adapted to register outlet-side oscillations, of said at least one measuring tube.

* * * * *